United States Patent [19]
Rozier, Jr. et al.

[11] Patent Number: 5,881,979
[45] Date of Patent: Mar. 16, 1999

[54] TELESCOPING LEVELER

[75] Inventors: Charles P. Rozier, Jr., New York, N.Y.; Michael L. McAllister, Harleysville, Pa.

[73] Assignee: Knoll, Inc., East Greenville, Pa.

[21] Appl. No.: 868,681

[22] Filed: Jun. 4, 1997

[51] Int. Cl.[6] ................................. F16M 11/26
[52] U.S. Cl. .................... 248/188.5; 248/188.4
[58] Field of Search ............... 248/188.5, 188.4, 248/188.2, 188.8, 188.9, 677, 649, 650, 354.3

[56] References Cited

U.S. PATENT DOCUMENTS

| | | | |
|---|---|---|---|
| 287,913 | 11/1883 | Dawson et al. | 248/188.4 |
| 663,804 | 12/1900 | Buder | 248/188.5 |
| 972,287 | 10/1910 | Swift | 248/188.4 |
| 1,229,830 | 6/1917 | Von Der Lin | 248/188.4 |
| 2,403,338 | 7/1946 | Butler | 248/188.4 |
| 2,885,181 | 5/1959 | McCully et al. | 248/188.4 |
| 2,941,766 | 6/1960 | Van Ranst | 267/141.7 |
| 3,814,363 | 6/1974 | Brelosky | 248/188.4 |
| 4,193,233 | 3/1980 | VandenHoek et al. | 248/188.8 X |
| 4,700,430 | 10/1987 | Raftery . | |
| 4,721,275 | 1/1988 | Benton et al. | 248/188.4 |
| 4,789,121 | 12/1988 | Gidseg et al. | 248/188.4 X |
| 4,914,873 | 4/1990 | Newhouse . | |
| 5,042,764 | 8/1991 | Carpinella et al. | 248/188.2 |
| 5,116,004 | 5/1992 | Luecke | 248/188.5 X |
| 5,203,528 | 4/1993 | Oke | 248/188.4 |
| 5,320,049 | 6/1994 | Rowland | 108/150 |
| 5,533,457 | 7/1996 | Cox | 248/188.4 X |

*Primary Examiner*—Derek J. Berger
*Assistant Examiner*—Stephen S. Wentsler
*Attorney, Agent, or Firm*—Buchanan Ingersoll, P.C.

[57] ABSTRACT

A telescoping leveler can include a housing having one end securable to a support column of an article of furniture and a threaded bore provided in an opposite end, a cylindrical intermediate member threaded on both an outside surface and an inside surface with the threaded outside surface threaded into the threaded bore of the housing, and a leveling glide having an upper threaded shaft portion that can be threaded into the threaded inside surface of the cylindrical intermediate member. The leveling glide can also have a lower foot portion. Additionally, a plurality of telescoping cylindrical intermediate members can be provided between the housing and the leveling glide. Furthermore, a stop means can be provided to prevent the threaded shaft and the intermediate members from being fully removed out of the threaded bore and threaded inside surfaces.

14 Claims, 6 Drawing Sheets

TELESCOPING LEVELER

BACKGROUND OF THE INVENTION

The present invention relates to a device for leveling an article of furniture. More particularly the invention relates to a telescoping leveler for an article of furniture such as, for example, a desk or table.

Traditionally, most desk tops have been supported by four conventional legs or alternatively by an opposed pair of vertical support panels. But, on more recent modular desks, the tops are supported on C-shaped, or inverted T-shaped, support columns, so that the vertical leg of the support columns can be offset rearwards, away from the swing of the user's feet.

In order to level these desks or other articles of furniture on uneven floors, screw in retractable levelers, i.e. "glides," can be provided at the base of each support column. Glide assemblies commonly utilize an internally threaded housing through which a threaded shaft is engaged. The threaded housing can either be attached to or be an integral part of the support column. The support column can be adjusted vertically by screwing the threaded shaft into or out from the housing. Examples of such leveling glides are described in U.S. Pat. No. 5,320,049 to Rowland and U.S. Pat. No. 5,203,528 to Oke.

It is often desirable to minimize the height of the front of the base portion of the support columns to maximize clearance for the user's feet to swing over them. However, reducing this height also restricts the adjustment range of the threaded shaft by reducing the space into which it can retract. Whenever there has been a need for a large leveling extension range of adjustment, the threaded shaft of the leveler necessarily had to be made long enough to provide for greater extension. This can result in the front of the base being objectionably tall to conceal the lengthened threaded shaft. Alternatively, an aperture can be provided in the front of the base and the threaded shaft can be permitted to extend through the aperture. However, this does not alleviate the problem of minimizing the height of the front of the base to maximize clearance. The threaded shaft extending upwardly can be just as much of an obstruction as if the front of the base were made tall enough to conceal the threaded shaft, and might even be more hazardous.

However, some C/T-shaped leg bases have been provided with a leveling mechanism in which the entire base of each support column can be pivoted relative to the support column. Although the height of the front of the base can be minimized, it can also be more costly to design and manufacture this type of an adjustment mechanism. Additionally, this type of leveling mechanism can be more difficult and time consuming to adjust.

Therefore, there is a need for a leveling glide which, for a given base height, can provide a greater extendible range so that the front of the base can be of minimal height to maximize clearance for a user's feet to swing over top of them. Furthermore, such a leveler can be as simple and easy to adjust as a common glide assembly using a threaded housing and threaded shaft.

SUMMARY OF THE INVENTION

The present invention is directed to a telescoping leveler glide securable to a base of a support column of an article of furniture which can provide a greater extended height for a given base height. Such a telescoping leveler can thus provide a greater extendible range and still minimize the required height of the front of the base of the support column to maximize the available clearance for a user's feet to swing over the top of the base.

A telescoping leveler having features of the present invention can include a housing having a threaded cavity and an upper end which can be secured to the base of a support column. Also, a generally cylindrical intermediate member having an outer threaded surface can be engaged in the threaded cavity of the housing. In addition, the intermediate member can have a threaded bore in which a threaded shaft can be engaged. The intermediate member can thus be screwed into and out from the housing and the threaded shaft can likewise be screwed into and out of the intermediate member. In this manner, the threaded shaft and the intermediate member telescope in and out to provide a large extendible range and still maintain a low retracted height. Furthermore, a foot member can be attached to the threaded shaft for bearing the weight of the support column, and consequently, the article of furniture, against a floor.

To prevent the threaded shaft and the intermediate member from being fully removed or becoming disengaged if they are fully unscrewed, a stop means can be provided to retain the threaded shaft in the threaded bore of the intermediate member and the intermediate member in the threaded cavity of the housing.

To provide an even greater extendible range, multiple telescoping intermediate members can be provided between the housing and the threaded shaft. Thus, an ever greater extendible height can be provided and still maintain a relatively low base height to provide a maximum amount of clearance above the base of the support column.

Other details, objects, and advantages of the invention will become apparent from the following description and the accompanying drawings of certain presently preferred embodiments thereof.

BRIEF DESCRIPTION OF THE DRAWINGS

In the accompanying drawing figures certain preferred embodiments of the invention are illustrated in which.

DETAILED DESCRIPTION OF THE PREFERRED EMBODIMENTS

In the accompanying figures, certain preferred embodiments of a telescoping leveler having features of the present invention are illustrated in which like reference numbers refer to similar parts in the several drawings.

Figure 1:
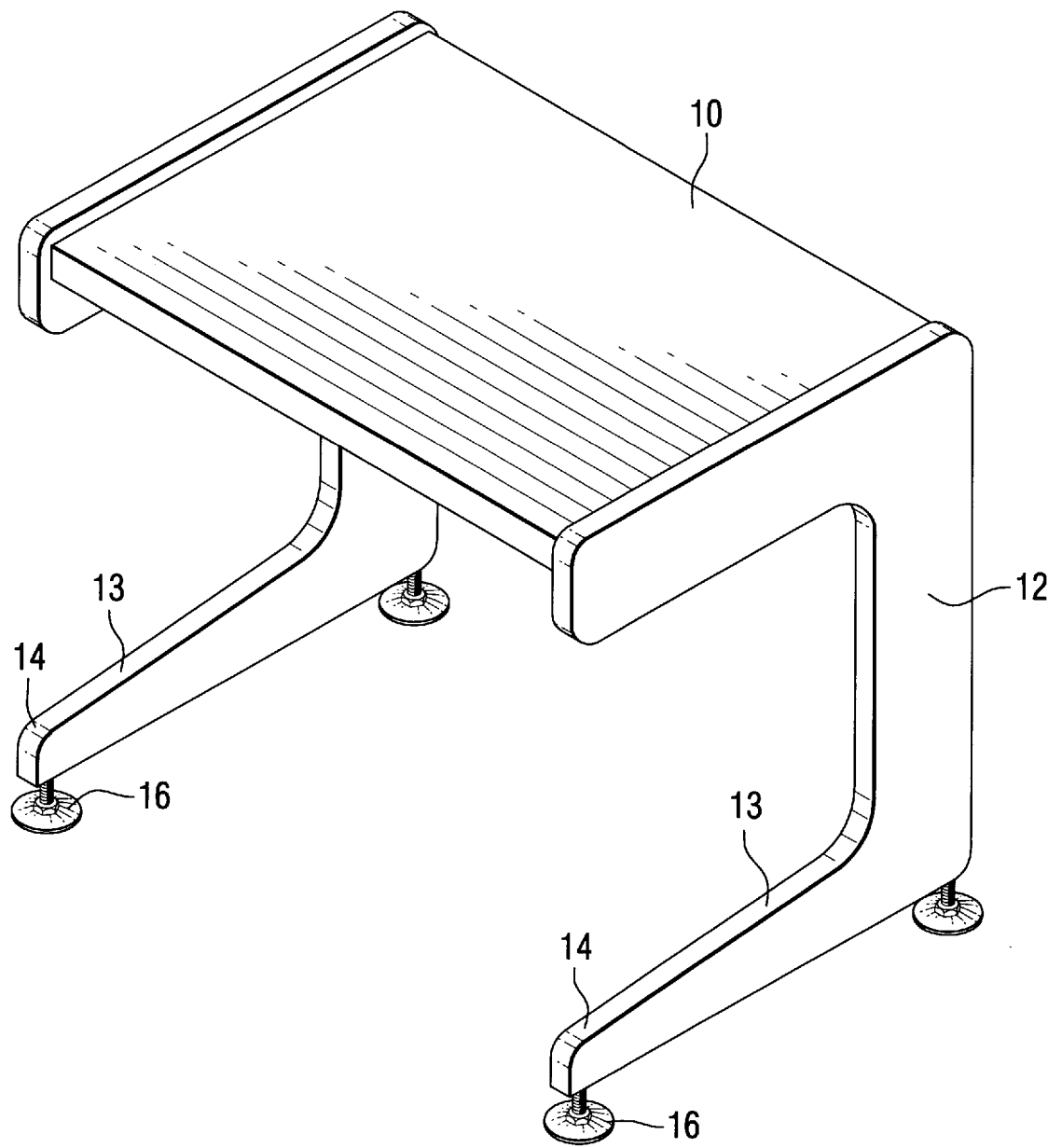
FIG. 1 is a perspective view of a common article of furniture.

A common type of office furniture, for example a desk 10, having C-shaped support columns 12 is illustrated, in FIG. 1, having a pair of telescoping levelers 16 connected at the front ends 14 of the bases 13 of the support columns 12. Telescoping levelers 16 are provided in order to adjust the height of the desk 10 to compensate for an uneven surface upon which the desk 10 may be located.

Figure 2:
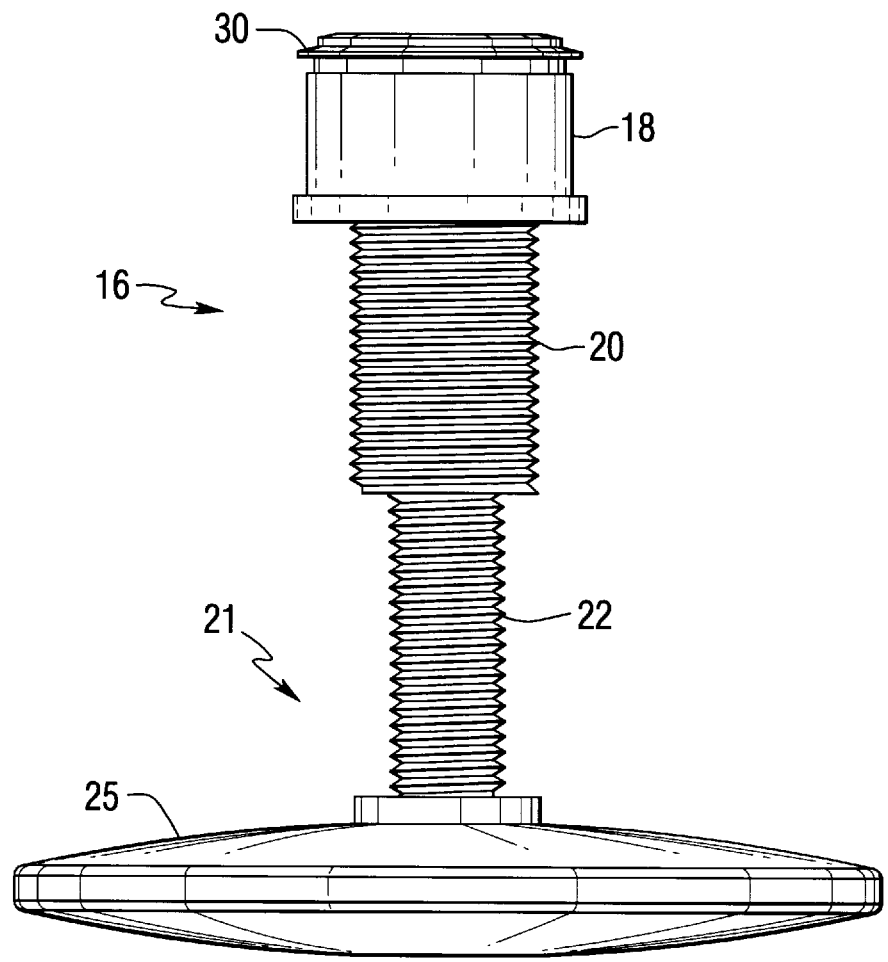
FIG. 2 is a side view of an embodiment of the present invention shown in a fully extended position.
Figure 3:
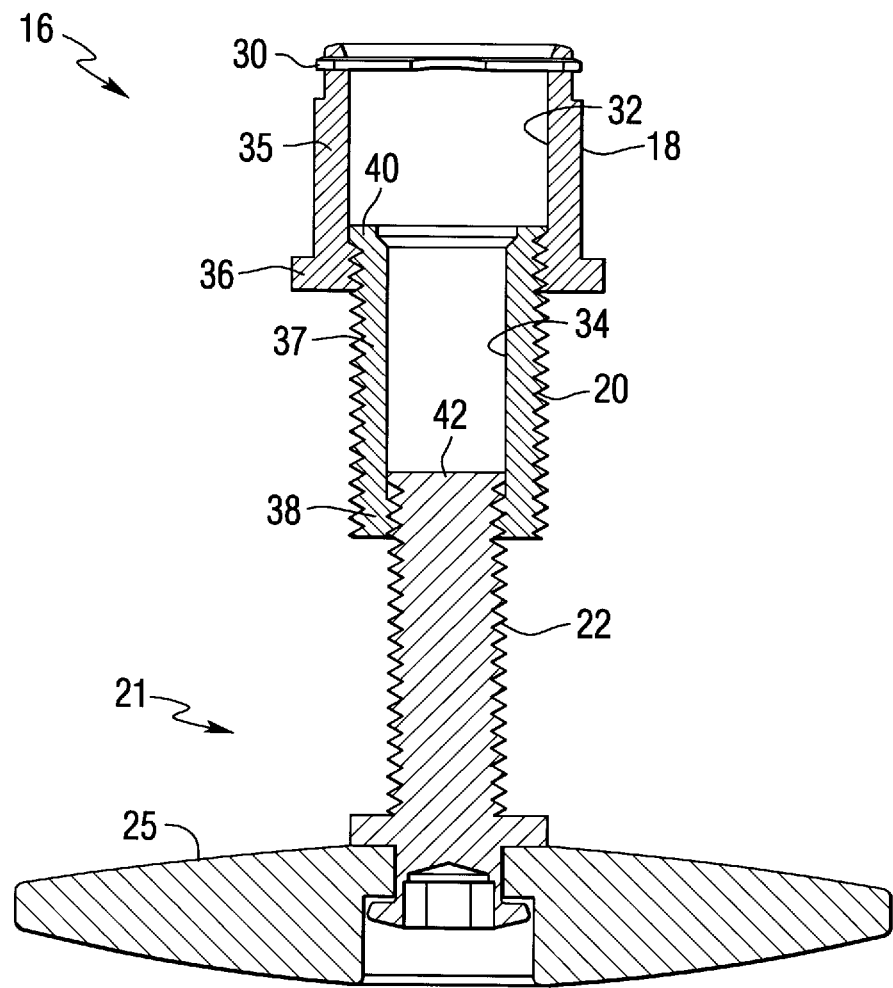
FIG. 3 is a cross section view of the embodiment shown in FIG. 2.

A telescoping leveler 16 having features of the present invention is shown in more detail in FIGS. 2–3 and can include a housing member 18 which can be secured in the front ends 14 of the bases 13 using a retaining clip means 30, or by other means known to those skilled in the art. The housing 18 can have a threaded cavity 32 in which at least one generally cylindrical intermediate member 20 having external threads is engaged. The intermediate member 20 can also have a threaded bore 34 in which a leveling glide 21 is engaged. The leveling glide 21 can have an upper threaded shaft portion 22 attached to a foot member 25 which provides a weight bearing surface between a floor and the support column 12 of the article of furniture 10.

A means for preventing the intermediate member 20 and the leveling glide 21 from becoming disengaged if fully unscrewed can also be provided as illustrated in FIG. 3. The threaded cavity 32 of the housing 18 has a smooth upper portion 35 and a threaded lower portion 36. The intermediate member 20 can have an oversize top portion 40 which is retained by the lower threaded portion 36 when the intermediate member 20 is unscrewed from the threaded cavity 32 a certain distance. Thus, the intermediate member 20 cannot be completely removed out of the threaded cavity 32. One easy way of providing the oversized top portion 40 is by striking the top surface of the intermediate member 20 with enough force to deform the top portion thereby distorting the top threads. In like manner, the threaded shaft 22 of the leveling glide 21 can be prevented from becoming disengaged or being removed from the threaded bore 34 of the intermediate member 20 by providing a smooth upper portion 37 and a threaded lower portion 38 in the threaded bore 34 of the intermediate member. The threaded shaft 22 can similarly have an oversized head portion 42 which is held in the threaded bore 34 by the lower threaded portion 38. The oversize head portion 42 can be provided by striking the top of the threaded shaft 22 thereby distorting the top threads, as described above in connection with forming the oversized top portion 40 of the intermediate member 20. Although a particular stop means has been described in detail, it is understood that other means well known to those skilled in the art could also be employed and the particular means described is by way of example only and should not be interpreted as limiting to the invention.

Figure 4:
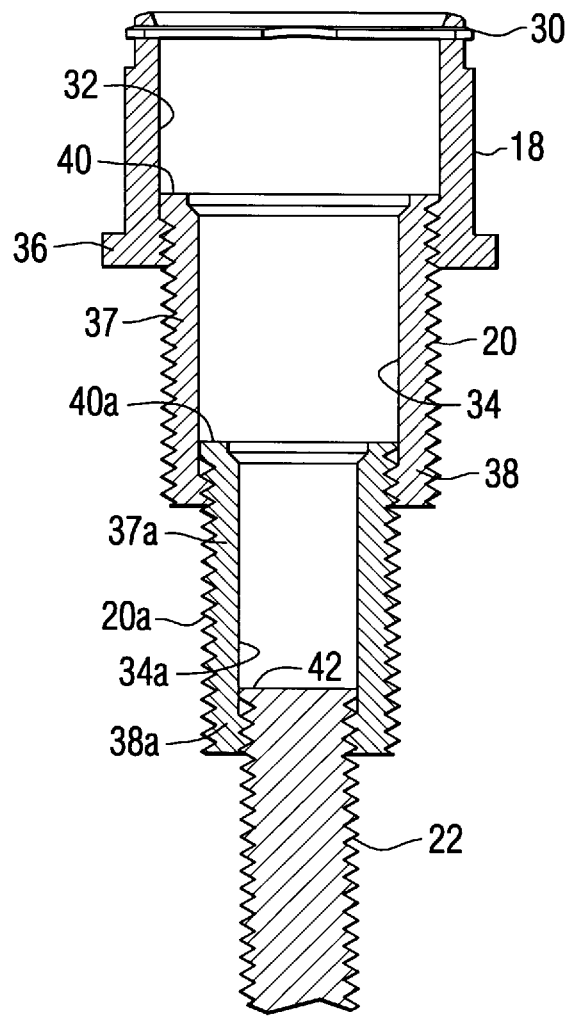
FIG. 4 is a partial cross section of a side view of another embodiment of the present invention.

The telescoping leveler 16 has been illustrated and described as having a single cylindrical intermediate member 20, but it is to be understood that additional telescoping intermediate members could be provided. For example, to provide a greater extendible range, the telescoping leveler 16 can have a second telescoping generally cylindrical intermediate member 20a, as illustrated in FIG. 4, sized to be received in the first telescoping intermediate member 20. The second intermediate member 20a can have a bore 34a and external threads just like the intermediate member 20. Also, like the first intermediate member 20, the second intermediate member 20a can have a bore 34a having a smooth upper portion 37a and a threaded lower portion 38a. The second intermediate member 20a can also have an oversized top portion 40a which is retained by the lower threaded portion 38 of the bore 34 of the intermediate member 20. In this case, the oversized head portion 42 of the threaded shaft 22 is retained by the lower threaded portion 38a of the bore 34a of the second intermediate member 20a. Each telescoping intermediate member, such as 20a, can be unscrewed extended from a surrounding telescoping intermediate member, such as 20, by rotating the foot member 25 in a certain direction, for example clockwise.

To retract the telescoping intermediate members 20, 20a, the foot member 25 is rotated in a direction, for example counterclockwise, opposite the direction in which it was previously rotated in order to extend the intermediate members 20, 20a.

Although more costly to produce, adding more telescoping intermediate members, such as 20a (20b, 20c . . . 20n), can further increase the extendible range of the telescoping leveler 16 while maintaining a relatively low height at the front end 14 of the base of the support column 12. However, since each additional intermediate member telescopes within another intermediate member, the diameter of the housing 18, each intermediate member 20, 20a, and the threaded shaft 22 must be appropriately sized. Nevertheless, this aspect does not greatly affect the overall height of the front ends 14 of the bases 13 of the support columns 12.

Figure 5:
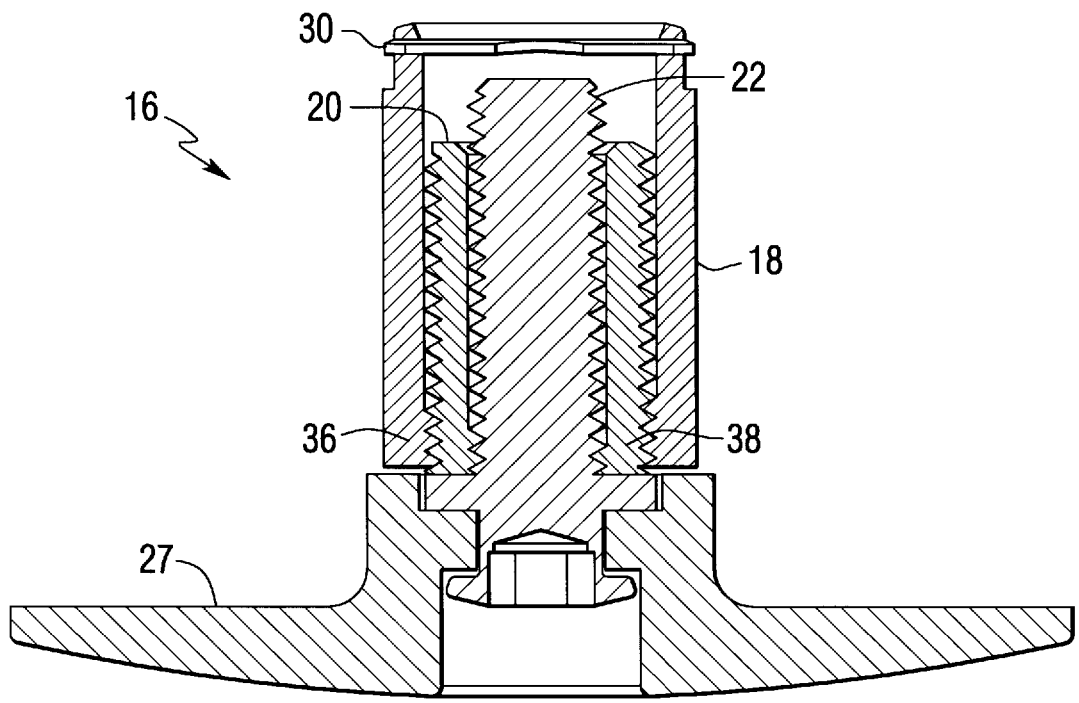
FIG. 5 is a cross section of a side view of yet another embodiment of the present invention.

An alternative embodiment of the leveling glide 21 is illustrated in FIG. 5 having a different shaped foot member 27. The telescopic leveler 16 is illustrated in a fully retracted position wherein the threaded shaft 22 of the leveling glide 21 is completely threaded into the bore 34 of the intermediate member 20 and the intermediate member 20 is completely threaded into the bore 32 of the housing 18. In this fully retracted position, the height of the telescoping leveler 16 is the fixed height of the housing 18, plus the additional height of the foot portion 27.

Figure 6:
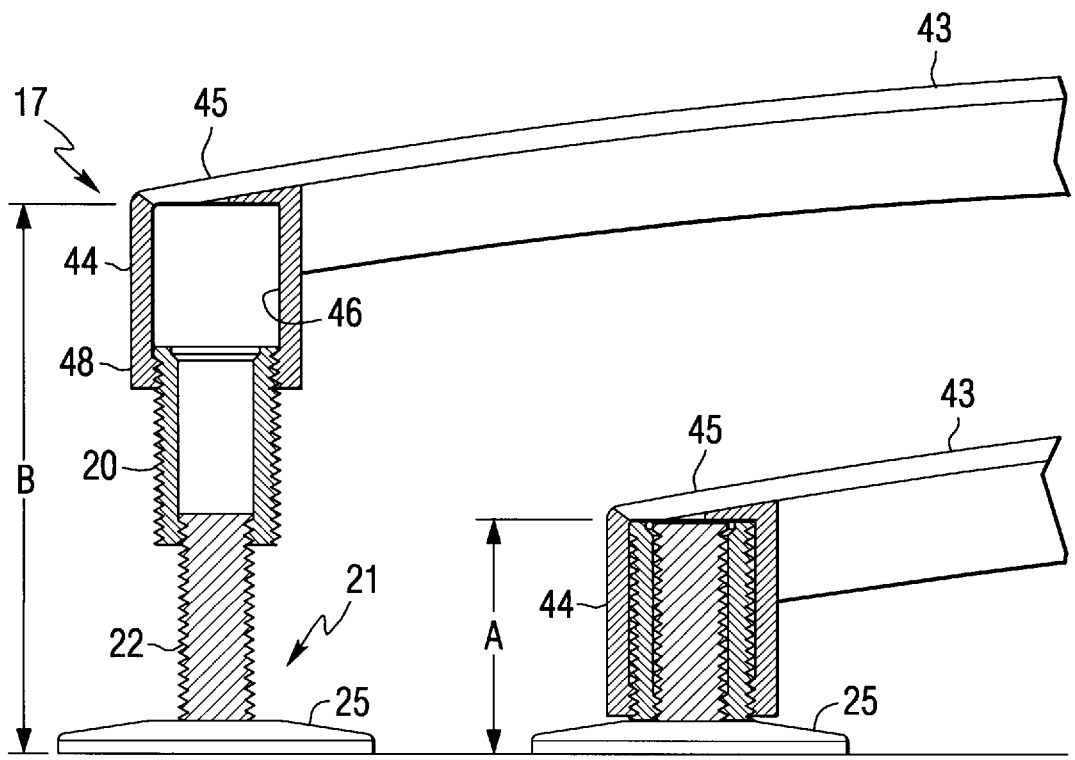
FIG. 6 is cross section of a side view of a further embodiment of the present invention shown in a fully retreated position.

In an alternative embodiment of a telescoping leveler 17, a housing member 44 can be formed as an integral portion of the support column 43 of an article of furniture as shown in FIG. 6. The housing 44 can have a cavity 46 in which at least a lower portion 48 thereof is threaded. The dimensions A and B denote the fully retracted height and the fully extended height, respectively. For example, the fully retracted height A can be as little as 1.5 inches and the fully extended height B can be 3.5 inches. Thus, it can be seen that a relatively low height of the front end 45 of the support column 43 of the article of furniture can be maintained to maximize clearance for the user's feet. Yet, the telescoping leveler 17 can still provide for a large amount of vertical travel if needed to level the article of furniture. Furthermore, if additional telescoping intermediate members are provided, the extended height of the leveler 17 can be increased without substantially increasing the retracted height. In addition to the housing member 44 being integrally formed with the support column 43, it could be cast as a separate part and then affixed within a cavity formed in the support column 43. In this case, the housing member 44 can be affixed in the support column 43 using a retaining clip means 30, as described heretofore with respect to FIG. 4, or can be affixed by other means well known to those skilled in the art.

Additional telescoping intermediate members, such as 20a, can be provided by increasing the diameter of the housing, 18 or 44, in order to accept additional threaded telescoping intermediate members like 20a. Also, the diameter of the threaded shaft 22 can be reduced. Most likely, if more telescoping intermediate members are provided to increase the available extension of the leveler, some compromise between the diameter of the threaded shaft 22, the outer diameter of the housing, 18 or 44, and the diameter of the telescoping intermediate members, 20 and 20a, can be adjusted to come up with a suitable design.

In one method of operation, to raise a corner of a support column 12 to level the article of furniture 10 shown in FIG. 1, the corner of the furniture 10 to be leveled is lifted a short distance off the floor to take the pressure off of the leveling glide 16. The foot member 25 can then be rotated to extend the threaded shaft 22 from the threaded bore 34 of the intermediate member until it stops. If additional extension is desired, the user can continue rotating the foot member 25 which causes the intermediate member 20 to begin extending from the cavity 32 of the housing 18 until it also stops. If more extension is needed, and additional telescoping intermediate members, such as 20a shown in FIG. 4, are provided, the user may continue rotating the foot member 25 until each additional intermediate member is fully extended. To retract the telescoped members, the foot member 25 is simply rotated in the opposite direction until each telescoped member is fully retracted.

Figure 7:
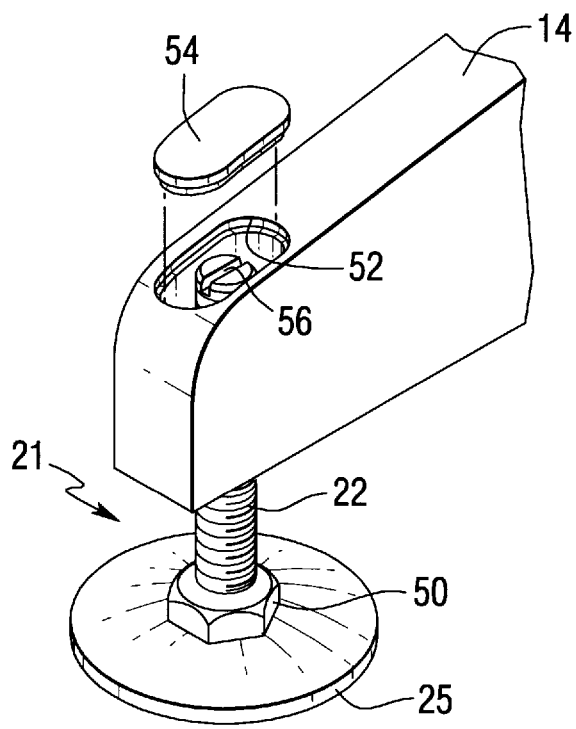
FIG. 7 is a close up view partially in section of the front end of a support column.
Figure 8A:
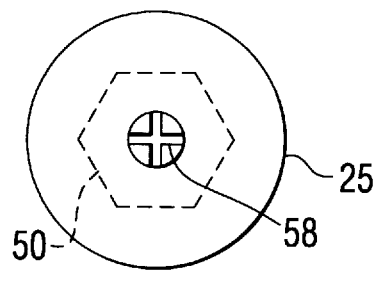
FIG. 8a is a top plan view of an embodiment of the leveling glide shown in FIG. 7.
Figure 8B:
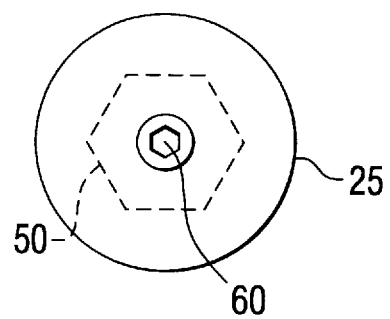
FIG. 8b is a top plan view of another embodiment of the leveling glide shown in FIG. 7.

Other alternative methods of operation, illustrated in FIG. 7, 8a and 8b, can include providing a nut 50 rigidly attached to the threaded shaft 22 of the leveling glide 21 which is accessible between the lower edge of the housing 18 and the foot member 25. A wrench can be used to turn the nut 50 causing the threaded shaft 22 to rotate which extends the leveling glide 21 without having to first raise the corner of the desk. Similarly, the top of the front end 14 (of the base 13 of support column 12), and the housing, not shown in FIGS. 7–8b, might have an access opening 52 for accessing the top of the threaded shaft 22. The opening 52 can be covered by a cap 54 for aesthetic purposes. The top of the threaded shaft 22 can be provided with a slot 56, or other recess, such as a Phillips head 58 or allen wrench profile 60, shown in FIGS. 8a and 8b. Thus, a screw driver, or alien wrench, can be used to extend the leveling glide 21 without having to first lift up on the corner of the desk.

While certain embodiments of the invention have been described in detail, it will be appreciated by those skilled in the art that various modifications to those details could be developed in light of the overall teachings of the disclosure. Accordingly, the particular embodiments disclosed herein are intended to be illustrative only and not limiting to the scope of the invention which should be awarded the full breadth of the following claims and any and all embodiments thereof.

What is claimed is:

1. A telescoping leveler for an article of furniture, said telescoping leveler comprising:
   a. a housing having a threaded cavity;
   b. at least one generally cylindrical intermediate member having a threaded bore and a threaded outer surface, said threaded outer surface threadably engaged in the threaded cavity such that the at least one intermediate member can be extended from the threaded cavity to lengthen the leveler;
   c. a leveling glide having an upper threaded shaft portion threadably engaged in the threaded bore of the at least one intermediate member such that the threaded shaft portion can be extended from the threaded bore to further lengthen the leveler;
   d. said housing having a hole therethrough sized to provide access to said threaded shaft portion;
   e. said threaded shaft portion having a top surface configured for engagement by a hand tool; and
   f. said leveling glide being vertically adjustable by inserting said hand tool through said hole to engage said configured top surface for rotation of said threaded shaft portion.

2. The telescopic leveler of claim 1 further comprising a stop means for preventing at least one of:
   said threaded shaft portion from being fully disengaged from said at least one intermediate member; and
   said at least one intermediate member from being fully disengaged from said threaded cavity.

3. The telescopic leveler of claim 1 wherein a lower portion of said threaded cavity is threaded.

4. The telescopic leveler of claim 1 wherein a lower portion of said threaded bore of said at least one intermediate member is threaded.

5. The telescopic leveler of claim 1 wherein said housing is securable to a lower end of a support column of the article of furniture.

6. The telescopic leveler of claim 1 wherein said top surface is configured to be engaged by at least one of a screwdriver and an allen wrench.

7. An article of furniture comprising:
   a. at least one support column for supporting the article of furniture against a floor, said support column having a front end and an access opening through said front end;
   b. a housing having a threaded cavity, said housing connected to said support column, said housing having a hole therethrough in alignment with said access opening;
   c. a telescoping leveler having at least one generally cylindrical intermediate member having a threaded bore and a threaded outer surface, said threaded outer surface being threadably engageable in said threaded cavity such that said at least one intermediate member is extendible from said threaded cavity to lengthen said leveler; and
   d. a leveling glide having an upper threaded shaft portion threadably engaged in said threaded bore of said at least one intermediate member such that said threaded shaft portion is extendible from said threaded bore to further lengthen said leveler; and
   e. said access opening in said front end and said hole in said housing each sized to provide access to said threaded shaft portion.

8. The article of furniture of claim 7 wherein such article of furniture is a desk.

9. The article of furniture of claim 7 wherein such article of furniture is a table.

10. The article of furniture of claim 7 further comprising:
    a. said threaded shaft portion having a top surface configured for engagement by a hand tool; and
    b. said leveling glide being vertically adjustable by inserting said hand tool through said access opening and said hole to engage said configured top surface for rotation of said threaded shaft portion.

11. The article of furniture of claim 7 wherein said hole through said housing is sized to permit said threaded shaft portion to extend therethrough.

12. The article of furniture of claim 10 further comprising a stop means for preventing at least one of:
    said threaded shaft portion from being fully disengaged from said at least one intermediate member; and
    said at least one intermediate member from being fully disengaged from said threaded cavity.

13. The article of furniture of claim 10 wherein a lower portion of said threaded cavity is threaded.

14. The article of furniture of claim 10 wherein a lower portion of said threaded bore of said at least one intermediate member is threaded.

\* \* \* \* \*